(12) United States Patent
Yoneda et al.

(10) Patent No.: US 10,329,161 B2
(45) Date of Patent: Jun. 25, 2019

(54) HALOGEN-CONTAINING TIN OXIDE PARTICLES AND PRODUCTION METHOD THEREOF

(71) Applicant: Mitsui Mining & Smelting Co., Ltd., Tokyo (JP)

(72) Inventors: Yoshihiro Yoneda, Saitama (JP); Akira Aoki, Saitama (JP); Kenji Suzuoka, Saitama (JP)

(73) Assignee: MITSUI MINING & SMELTING CO., LTD., Tokyo (JP)

( * ) Notice: Subject to any disclaimer, the term of this patent is extended or adjusted under 35 U.S.C. 154(b) by 49 days.

(21) Appl. No.: 15/524,689

(22) PCT Filed: Sep. 4, 2015

(86) PCT No.: PCT/JP2015/075154
§ 371 (c)(1),
(2) Date: May 5, 2017

(87) PCT Pub. No.: WO2016/098399
PCT Pub. Date: Jun. 23, 2016

(65) Prior Publication Data
US 2018/0305217 A1    Oct. 25, 2018

(30) Foreign Application Priority Data
Dec. 19, 2014    (JP) .................. 2014-257249

(51) Int. Cl.
| *C01G 19/00* | (2006.01) |
| *C01G 19/02* | (2006.01) |
| *H01M 4/92* | (2006.01) |
| *H01M 8/1018* | (2016.01) |

(52) U.S. Cl.
CPC ............. *C01G 19/02* (2013.01); *C01G 19/00* (2013.01); *C01G 19/006* (2013.01); *H01M 4/925* (2013.01); *C01P 2002/52* (2013.01); *C01P 2002/54* (2013.01); *C01P 2002/60* (2013.01); *C01P 2006/12* (2013.01); *C01P 2006/40* (2013.01); *H01M 2008/1095* (2013.01)

(58) Field of Classification Search
CPC ........ C01G 19/006; C01G 19/02; H01B 1/08; B82Y 30/00; H01M 4/8803; H01M 4/925
USPC .............. 423/89, 93, 265, 618; 429/479–494
See application file for complete search history.

(56) References Cited

U.S. PATENT DOCUMENTS

| 5,246,623 A | 9/1993 | Giersberg et al. |
| 5,876,633 A | 3/1999 | Coleman |
| 5,876,634 A | 3/1999 | Coleman |
| 5,891,511 A | 4/1999 | Coleman et al. |
| 6,084,701 A | 7/2000 | Coleman |
| 6,165,388 A | 12/2000 | Coleman |
| 9,102,996 B2 | 8/2015 | Ceresa et al. |
| 9,269,472 B2 | 2/2016 | Mogi et al. |
| 2006/0292062 A1 | 12/2006 | Hojo et al. |
| 2013/0344336 A1 | 12/2013 | Mogi et al. |
| 2014/0093734 A1 | 4/2014 | Mogi et al. |
| 2014/0370292 A1 | 12/2014 | Ceresa et al. |
| 2015/0160379 A1* | 6/2015 | Shen ............... C01G 19/00 252/587 |
| 2015/0243999 A1 | 8/2015 | Takahashi et al. |

FOREIGN PATENT DOCUMENTS

| CN | 1121047 | 4/1996 |
| CN | 101580270 | 11/2009 |
| CN | 102139926 | 8/2011 |
| CN | 102583266 | 7/2012 |
| CN | 104150528 | 11/2014 |
| CN | 104185607 | 12/2014 |
| JP | 02-197014 | 8/1990 |
| JP | 06-92636 | 4/1994 |
| JP | 08-178882 | * 7/1996 |
| JP | 10-273321 | 10/1998 |
| JP | 11-11947 | 1/1999 |
| JP | 11-322336 | 11/1999 |
| JP | 2001-501322 | 1/2001 |
| JP | 2003-300727 | 10/2003 |
| JP | 2007-001826 | 1/2007 |
| JP | 2008-184373 | 8/2008 |
| JP | 2010-120800 | 6/2010 |
| JP | 2010-180112 | 8/2010 |
| JP | 2011-195839 | 10/2011 |
| TW | 201245046 | 11/2012 |
| WO | 2012/124499 | * 9/2012 |
| WO | 2012/124540 | * 9/2012 |
| WO | 2013/143456 | * 3/2013 |
| WO | WO 2014136908 | 9/2014 |

OTHER PUBLICATIONS

Translation of CN-101580270, Nov. 2009. (Year: 2009).*
International Search Report, PCT/JP2015/075154, dated Nov. 24, 2015.
Naoyasu Matsumura et al., "Enka Ammonium Tenka ni yoru Sanka Suzu no Biryushika", Heisei 6 Nendo Shokubai Kenkyu Happyokai [Dai 74 Kai CatSJ Meeting (A) ] Koen Yokoshu, Sep. 12, 1994 (Sep. 12, 1994), pp. 354 to 355.
G. Carturan et al., Effect of Sn/Sb ratio in determining crystallite Size of "Sn02-Sb205" semiconductors, Journal of Materials Science, Vol. 23, No. 9, Sep. 1988, p. 3156-3160.
Z. Fang et al., Synthesis of nanocrystalline SnO2 In supercritical water, Journal of Nanoparticle Research, Aug. 2007, vol. 9, No. 4, p. 683-687.

(Continued)

*Primary Examiner* — Steven J Bos
(74) *Attorney, Agent, or Firm* — Young & Thompson (57) ABSTRACT

These halogen-containing tin oxide particles have a BET specific surface area of 25-100 m$^2$/g and a crystallite diameter of 8-30 nm. The particles optimally contain 0.01-0.75 mass % halogen. Fluorine is optimally contained as the halogen. Optimally, the particles additionally contain tantalum, niobium, phosphorus, antimony, tungsten, or molybdenum. The volume resistivity is optimally 0.1-1000 Ω·cm.

9 Claims, 1 Drawing Sheet

(56) References Cited

OTHER PUBLICATIONS

Supplementary European Search Report dated Jun. 4, 2018 in corresponding European Patent Application No. 15869607.
Shanshan Wu et al., "Preparation, characterization and electrical properties of fluorine-doped tin dioxide nanocrystals", Journal of Colloid and Interface Science, vol. 346, No. 1, Feb. 19, 2010, pp. 12-16, XP055308200.
Chi-Hwan Han et al., "Synthesis of indium tin oxide (ITO) and fluorine-doped tin oxide (FTO) nano-powder by sol-gel combustion hybrid method", Materials Letters, Elsevier, Amsterdam, Netherlands, vol. 61, No. 8-9, Mar. 12, 2007, pp. 1701-1703, XP005922048.
Jiancheng Wang, "Preparation of energy and environmental materials with supercritical water medium", National Defense Industry Press, Beijing, Dec. 31, 2013 (partial translation).
Haiwen Wang et al., Synthesis of fluorine-doped tin oxide nanoparticles by combustion method, China Powder Industry, Beijing, Dec. 31, 2009 (partial translation).

\* cited by examiner

[Fig. 1]

HALOGEN-CONTAINING TIN OXIDE PARTICLES AND PRODUCTION METHOD THEREOF

TECHNICAL FIELD

The present invention relates to halogen-containing tin oxide particles and a method for producing the halogen-containing tin oxide particles. The halogen-containing tin oxide particles of the present invention are favorably used in fields utilizing their conductivity. Moreover, the present invention relates to a fuel cell electrode catalyst, a membrane electrode assembly including the electrode catalyst, and a solid polymer electrolyte fuel cell provided with the membrane electrode assembly.

BACKGROUND ART

A method of adding conductive powder to a plastic, which is an example of a non-conductive material, is known as a method of providing conductivity to a plastic. Metal powder, carbon black, tin oxide doped with antimony or the like, and the like are known as examples of the conductive powder. However, the color of a plastic to which metal powder or carbon black has been added is black, and thus the application of the plastic may be restricted. On the other hand, the color of a plastic to which tin oxide doped with antimony or the like has been added is bluish black, and thus the application of the plastic may also be restricted as in the case where carbon black or the like is added. In addition, the issue of an environmental load arises due to the use of antimony. To address this, extensive studies on tin oxide in which an element such as antimony that incurs a large environmental load is not used as a dopant have been conducted.

Accordingly, tin oxide in which a halogen such as fluorine, which incurs a relatively small environmental load, is used as a dopant element has been proposed (see Patent Literature 1 to 3). Specifically, Patent Literature 1 states that tin oxide powder is brought into contact with 10 to 40 vol % fluorine gas in an inert gas atmosphere, and thus the tin oxide is doped with fluorine and imparted with conductivity. Patent Literature 2 describes transparent tin oxide powder that does not contain antimony, phosphorus, or indium, but contains fluorine in an amount of 0.3 to 5.0%. This transparent tin oxide powder is produced by adding fluorine or a fluorine compound to an aqueous solution of tin hydroxide and performing dehydration, followed by thermal treatment at 350 to 800° C. at a humidity of 50% or higher in an inert atmosphere. Patent Literature 3 describes a technique for cleaning conductive flooring with a composition containing a conductive pigment made of tin oxide doped with fluorine.

In addition to the above-described method, a method of performing hydrothermal treatment using an alkali suspension on tin hydroxide powder and then calcining the powder is also proposed as a method of producing tin oxide particles (see Patent Literature 4). Patent Literature 4 states that it is preferable to perform hydrothermal treatment under conditions in which the pressure is 2 to 150 kgf/cm$^2$ and the temperature is 80 to 300° C.

CITATION LIST

Patent Literature

Patent Literature 1: JP H2-197014A
Patent Literature 2: JP 2008-184373A
Patent Literature 3: JP 2011-195839A
Patent Literature 4: JP H11-322336A

SUMMARY OF INVENTION

Technical Problem

A halogen tends to be eluted from halogen-containing tin oxide in an acidic environment. The halogen-containing tin oxide described in each Patent Literature described above has a similar tendency, and an improvement in the acid resistance of halogen-containing tin oxide has been in demand.

The present invention provides halogen-containing tin oxide particles that can address the various shortcomings of the above-described related art.

Solution to Problem

The present invention provides halogen-containing tin oxide particles having a BET specific surface area from 25 m$^2$/g to 100 m$^2$/g and a crystallite diameter from 8 nm to 30 nm, the halogen-containing tin oxide particles comprising halogen in an amount from 0.01 mass % to 0.75 mass %.

The present invention provides a method for producing halogen-containing tin oxide particles, comprising:
neutralizing a halogen-containing aqueous solution containing a divalent tin compound with an alkali to form a slurry containing a tin oxide precursor;
oxidizing the precursor; and
performing hydrothermal treatment on the slurry containing the oxidized precursor under a high-temperature-high-pressure condition in which a temperature is 270° C. or higher and pressure is 20 MPa or higher.

The present invention provides a fuel cell electrode catalyst obtained by causing halogen-containing tin oxide particles to support a catalyst,
wherein a BET specific surface area is from 25 m$^2$/g to 100 m$^2$/g, the halogen-containing tin oxide has a crystallite diameter from 8 nm to 30 nm, and the fuel cell electrode catalyst comprises halogen in an amount from 0.01 mass % to 0.75 mass %.

Advantageous Effects of Invention

The present invention provides halogen-containing tin oxide particles that have high acid resistance and are favorably used in a transparent conductive film, an oxide carrier for a solid polymer electrolyte fuel cell, an infrared shielding film, and the like, and a method of producing the halogen-containing tin oxide particles. Furthermore, the present invention provides an electrode catalyst in which the elution of a halogen while a fuel cell is in operation is suppressed.

DESCRIPTION OF EMBODIMENTS

Hereinafter, the present invention will be described based on a preferred embodiment. Halogen-containing tin oxide particles of the present invention are conductive particles. In the present invention, the tin oxide is caused to contain a halogen for the purpose of enhancing the conductivity of the particles. It is thought that the halogen-containing tin oxide particles of the present invention have the structure of a tin oxide crystal substituted with a halogen atom at the position of an oxygen atom. It is thought that the halogen-containing tin oxide particles of the present invention have the properties of an n-type semiconductor and exhibit conductivity due to electrons serving as carriers.

When a powder X-ray diffraction measurement is performed on the halogen-containing tin oxide particles of the present invention, the diffraction peaks are similar to those of tetravalent $SnO_2$. Therefore, it is thought that most of the tin in the halogen-containing tin oxide particles of the present invention is tetravalent. In addition, since the halogen-containing tin oxide particles of the present invention have high conductivity, the conductivity of the transparent conductive film and the like can be enhanced.

Favorable examples of the halogen contained in the halogen-containing tin oxide particles include fluorine and chlorine. These elements can be used alone or in combination of two or more. In particular, it is preferable to use fluorine as the halogen from the viewpoint of high conductivity and high acid resistance.

The halogen-containing tin oxide particles of the present invention contain the halogen preferably in an amount from 0.01 mass % to 0.75 mass %, and more preferably in an amount from 0.2 mass % to 0.7 mass %. When the content of the halogen is set to be within this range, the halogen-containing tin oxide particles can be imparted with acid resistance while the conductivity thereof is enhanced. When two or more types of halogens are used, this content ratio is calculated based on the total amount thereof. As the content ratio of the halogen is increased, the conductivity of the tin oxide tends to be enhanced, but this makes it more likely that the halogen will be eluted from the particles in a solution. It is preferable to set the upper limit of the content ratio of the halogen in consideration of this point. The content ratio of the halogen contained in the halogen-containing tin oxide particles is measured by combustion-ion chromatography using an automatic sample combustion apparatus (AQF-2100H) manufactured by Mitsubishi Chemical Analytech Co. Ltd., for example.

The halogen-containing tin oxide particles of the present invention may contain no elements other than the halogen as an additive element or contain another element in addition to the halogen. Examples of the other element include tantalum, niobium, phosphorus, antimony, tungsten, and molybdenum. In the following description, these elements are also referred to as "additive elements" collectively. The additive elements can be used alone or in combination of two or more. When tin oxide is caused to contain an additive element in addition to the halogen, an advantageous effect of further improving the conductivity is realized. The additive element serves as a factor in suppressing the growth of particles in a favorable method of producing halogen-containing tin oxide, which will be described later, and thus is also advantageous in that fine particles of halogen-containing tin oxide are easily obtained. The obtained halogen-containing tin oxide fine particles contribute to an increase in the specific surface area of the particles.

The content ratio of the additive element contained in the halogen-containing tin oxide particles is measured using an ICP mass spectrometer (ICP-MS), for example.

Having a large crystallite diameter is one of the features of the halogen-containing tin oxide particles of the present invention. Specifically, the crystallite diameter is preferably from 8 nm to 30 nm, more preferably from 8 nm to 25 nm, and even more preferably from 8 nm to 20 nm. When the crystallite diameter of the halogen-containing tin oxide particles of the present invention is set to be within this range, the elution amount of the halogen in an acidic solution is reduced to an extremely low level, thus making it possible to reduce the change in conductivity. The halogen-containing tin oxide particles having the above-described crystallite diameter can be favorably produced using a method described later, for example.

The crystallite diameter of the halogen-containing tin oxide particles is calculated based on Scherrer's equation defined by Equation (1) below using powder X-ray diffractometry. (110) is used as a measurement peak.

$$D = k \times \lambda / \beta \times \cos \theta \qquad (1)$$

D: crystallite diameter (angstrom)
k: constant (when measurement X-ray is Cu and Kα and a half value width is used, k is 0.9)
λ: wavelength of measurement X-ray (angstrom)
β: half value width of diffracted ray (radian)
θ: Bragg angle of diffracted ray (radian)

In addition to having a large crystallite diameter, being fine particles is another feature of the halogen-containing tin oxide particles of the present invention. A BET specific surface area is known as a criterion for indicating the size of particles. The larger the BET specific surface area is, the finer the particles are. The halogen-containing tin oxide particles of the present invention have a BET specific surface area preferably from 25 $m^2/g$ to 100 $m^2/g$, more preferably from 25 $m^2/g$ to 90 $m^2/g$, and even more preferably from 40 $m^2/g$ to 90 $m^2/g$. In the halogen-containing tin oxide particles of the present invention that have a large crystallite diameter and are fine particles, a small number of grain boundaries are present in a single particle. A grain boundary is a portion of a particle in which a crystalline structure is unstable. Therefore, it is thought that the halogen is likely to be eluted from the grain boundaries in the halogen-containing tin oxide particles in a harsh environment. However, the halogen-containing tin oxide particles of the present invention include a small number of grain boundaries as described above, and this seems to reduce the amount of halogen eluted in an acidic solution to an extremely low level. Moreover, the halogen-containing tin oxide particles of the present invention have a large specific surface area as described above, and thus can be favorably used in an optical system including a transparent conductive film and the like.

The BET specific surface area of the halogen-containing tin oxide particles can be measured using "Micromeritics Flowsorb II 2300" manufactured by Shimadzu. Corporation as a BET specific surface area measurement apparatus in accordance with "(3.5) One point method" in "6.2 Flow method" of JIS R 1626 "Methods for measuring the specific surface area of fine ceramic powders by gas adsorption using the BET method". A nitrogen-helium mixed gas containing nitrogen serving as an adsorption gas in an amount of 30 vol % and helium serving as a carrier gas in an amount of 70 vol % is used as a gas for the measurement.

As described above, having a large crystallite diameter and a large BET specific surface area is one of the features of the halogen-containing tin oxide particles of the present invention. Focusing on the crystallite diameter of tin oxide particles and setting the value thereof to be within a specific range, or focusing on the BET specific surface area of tin oxide particles and setting the value thereof to be within a specific range are known art, but an attempt has not been made to increase both the crystallite diameter and the BET specific surface area. Moreover, when an attempt is made to increase the size of crystallites by using a general firing method or the like, the BET specific surface area tends to decrease. In contrast, the crystallite diameter and the BET specific surface area of the halogen-containing tin oxide particles prescribed in the present invention are achieved through the production of particles by using a method of hydrothermal synthesis at a high temperature and high pressure, which will be described later.

It is preferable that the crystallite diameter of the halogen-containing tin oxide particles is close to the particle diameter thereof from the viewpoint of suppressing the elution of the halogen in an acidic solution. The reason is that this makes it possible to reduce the number of grain boundaries present in the particles. From this viewpoint, when the crystallite diameter of the halogen-containing tin oxide is taken as $D_C$, and the particle diameter of the halogen-containing tin oxide particles converted from the BET specific surface area is taken as $D_B$, the value of $D_C/D_B$, which is a ratio between $D_C$ and $D_B$, is preferably 0.55 or greater, more preferably 0.6 or greater, even more preferably 0.7 or greater, even more preferably 0.8 or greater, even more preferably 0.85 or greater, and even more preferably 0.9 or greater. The closer to 1 the upper limit of the value $D_C/D_B$ is, the more preferable it is.

The particle diameter $D_B$ of the halogen-containing tin oxide particles converted from the BET specific surface area is calculated using the following equation.

Diameter $D_B$ (nm) converted from BET specific surface area=6/BET specific surface area (m$^2$/g)/true density (g/cm$^3$)×1000

The halogen-containing tin oxide particles of the present invention, which have a large crystallite diameter and a large BET specific surface area, have not only high acid resistance but also high conductivity. The conductivity has an influence on the electron transporting speed, and therefore, higher conductivity is preferable. When volume resistivity is used as a criterion for indicating the degree of conductivity, the halogen-containing tin oxide particles of the present invention has a volume resistivity of preferably 0.1 Ω·cm or higher and 1000 Ω·cm or lower, and more preferably 0.1 Ω·cm or higher and 100 Ω·cm or lower. An increase in the volume resistivity is small even after the halogen-containing tin oxide particles of the present invention are subjected to an acid resistance test. When the volume resistivity of the halogen-containing tin oxide particles of the present invention prior to the acid resistance test is taken as R1, and the volume resistivity thereof after the acid resistance test is taken as R2, the value R2/R1 is preferably 100 or smaller, more preferably 50 or smaller, and even more preferably 10 or smaller. The closer to 1 the lower limit value of R2/R1 is, the more preferable it is.

The volume resistivity of the halogen-containing tin oxide particles of the present invention is measured using a powder resistivity measurement system (PD-51, manufactured by Mitsubishi Chemical Analytech Co. Ltd.) and a resistivity meter (MCP-T610, manufactured by Mitsubishi Chemical Analytech Co. Ltd.). Specifically, 1 g of a sample is introduced into a probe cylinder, and then a probe unit is set on PD-51. A load of 18 kN is applied using a hydraulic jack to produce a cylindrical pellet having a diameter of 20 mm. The resistance value of the obtained pellet is measured using MCP-T610. The volume resistivity is calculated based on the measured resistance value and the sample thickness.

The above-mentioned acid resistance test is performed in accordance with the following method. 200 cc of a 1 mol/HNO$_3$ solution is prepared and stirred using a hot stirrer or the like while the temperature is adjusted to 50° C. 3 g of the halogen-containing tin oxide particles is added to the solution, and a dissolution test is performed for 5 hours. Thereafter, the particles are washed with pure water using a centrifuge, and washing is repeated until the supernatant with 100 μS/cm or lower is obtained. The obtained cake is dried at 60° C. and made into dry powder. Then, the amounts of halogen contained in the particles prior to and after the acid resistance test are measured using the above-described method. The elution ratio of the halogen between prior to and after the acid resistance test is calculated based on the following equation.

Elution ratio of halogen (%)={(mass of halogen prior to acid resistance test−mass of halogen after acid resistance test)/mass of halogen prior to acid resistance test}×100

Next, a favorable method of producing halogen-containing tin oxide particles of the present invention will be described. These particles are favorably produced through hydrothermal synthesis at a high temperature and high pressure. Specifically, the particles are favorably produced using a method including steps (a) to (c) below.

(a) Step of neutralizing a halogen-containing aqueous solution containing a divalent tin compound with an alkali to form a slurry containing a tin oxide precursor.
(b) Step of oxidizing the above-mentioned precursor.
(c) Step of performing hydrothermal treatment on the slurry containing the above-mentioned oxidized precursor under the high-temperature-high-pressure condition in which the temperature is 270° C. or higher and the pressure is 20 MPa or higher.

Hereinafter, each of these steps will be described in detail.

First, in the step (a), a divalent tin compound serving as a tin source is prepared. It is preferable that this tin compound is a water-soluble compound. Moreover, it is preferable that this tin compound contains a halogen. The reason for this is that using a halogen-containing tin compound makes it unnecessary to prepare a separate halogen source. Examples of such a tin compound include stannous fluoride (SnF$_2$) and stannous chloride (SnCl$_2$).

When desired halogen-containing tin oxide particles contain the above-described additive element, a compound serving as the source of the additive element is also prepared in the step (a). It is preferable that this compound is soluble in water or a solvent such as alcohol. When the additive element is tantalum, for example, TaCl$_5$ or the like can be used as such a compound. When the additive element is niobium, NbCl$_5$ or the like can be used. When the additive element is antimony, SbCl$_3$ or the like can be used. When the additive element is tungsten, WCl$_6$, Na$_2$WO$_4$.2H$_2$O, or the like can be used. When the additive element is molybdenum, for example, MoCl$_5$, Na$_2$MoO$_4$.2H$_2$O, or the like can be used. When the additive element is phosphorus, phosphoric acid or a salt thereof such as H$_3$PO$_4$, Na$_3$PO$_4$.2H$_2$O, or Na$_2$HPO$_4$ can be used.

In the step (a), the above-described compound serving as the tin source and the compound serving as the source of the additive element, if necessary, are dissolved in water to form an aqueous solution, and the tin is neutralized by mixing this aqueous solution and an alkali, so that a slurry containing a precursor of a tin oxide is formed. As another method, instead of dissolving the compound serving as the source of the additive element and the compound serving as the tin source in water to form an aqueous solution, it is also possible to cause an aqueous solution of an alkali to contain the compound serving as the source of the additive element in advance. Examples of the alkali include alkali metal hydroxides such as sodium hydroxide and potassium hydroxide, alkali earth metal hydroxides such as magnesium hydroxide and barium hydroxide, carbonates such as $NaHCO_3$ and $NH_4HCO_3$, and ammonia. The concentration of tin (II) in the above-mentioned aqueous solution prior to mixing is preferably $1.0 \times 10^{-3}$ mol/l or higher and 2.5 mol/l or lower, and more preferably $1.0 \times 10^{-2}$ mol/l or higher and 1 mol/l or lower. On the other hand, the concentration of alkali in terms of a hydroxide ion, for example, is preferably $1.0 \times 10^{-3}$ mol/l or higher and 6 mol/l or lower, and more preferably $1.0 \times 10^{-2}$ mol/l or higher and 1 mol/l or lower.

The aqueous solution containing tin (II) and the aqueous solution of an alkali are mixed to form a precipitate of tin containing fluorine. This precipitate is a substance that is a precursor of a desired tin oxide. When this precursor is formed, the aqueous solution of an alkali serving as a feed solution may be added to the aqueous solution containing tin (II) serving as a mother solution, or the aqueous solution containing tin (II) serving as a feed solution may be added to the aqueous solution of an alkali serving as a mother solution. Even when either is used as the mother solution, it is preferable to set the mixing ratio between the aqueous solution containing tin (II) and the aqueous solution of an alkali such that the ratio of the hydroxide ion with respect to 1 mol of tin (II) is preferably from 0.1 mol to 5 mol, and more preferably from 0.5 mol to 4 mol. Moreover, even when either is used as the mother solution, a feed solution may be added successively or all at once.

A method of mixing the aqueous solution containing tin (II) and the aqueous solution of an alkali may be performed heated, cooled, or without being heated. When the mixing is performed heated, a feed solution that is heated or not heated can be added to a mother solution that has been heated to a predetermined temperature, for example. In general, the mixing can be performed at room temperature, and a method of mixing in water at a temperature of 30° C. or lower, particularly 25° C. or lower, to form the precursor is particularly preferable. It is preferable to employ this mixing condition because the obtained particles of the precursor become finer, and thus the desired halogen-containing tin oxide particles can be made finer.

After the step (a) is finished in this manner, the step (b) is performed subsequently. In this step, the above-mentioned precursor is oxidized. Oxidation of the precursor mainly includes aspects (b-1) and (b-2) below.

(b-1) The slurry containing the precursor is mixed with an oxidant to oxidize the precursor.

(b-2) The precursor in a dry state is fired to be oxidized.

Hereinafter, these aspects will be described.

An oxidant having oxidizing power that can oxidize divalent tin in the precursor into tetravalent tin is used as the oxidant used in the aspect (b-1). Examples of such an oxidant include hydrogen peroxide, hypochlorous acid, permanganates, and potassium nitrate. These oxidants can be used alone or in combination of two or more.

It is sufficient that the addition amount of the oxidant is an amount that enables the oxidation of divalent tin present in the precursor. When hydrogen peroxide is used as the oxidant, for example, the addition amount of hydrogen peroxide is preferably from 0.1 mol to 1.0 mol, and more preferably from 0.5 mol to 0.7 mol, with respect to 1 mol of divalent tin.

In the aspect (b-2), the precursor is filtered out from the slurry obtained in the step (a) and dried into a powder state. Subsequently, the precursor that has been dried into a powder state is subjected to a firing process. An oxidizing atmosphere containing oxygen, such as air, can be used as the atmosphere in which the firing is performed. It is sufficient that the firing temperature is a temperature that enables the oxidation of divalent tin in the precursor into tetravalent tin, and the firing temperature is preferably set to 200° C. or higher and 600° C. or lower, and more preferably 250° C. or higher and 500° C. or lower, for example. On the condition that the firing temperature is within this range, the firing time is set to preferably 0.5 hours or longer and 24 hours or shorter, and more preferably 2 hours or longer and 10 hours or shorter.

Figure 1:
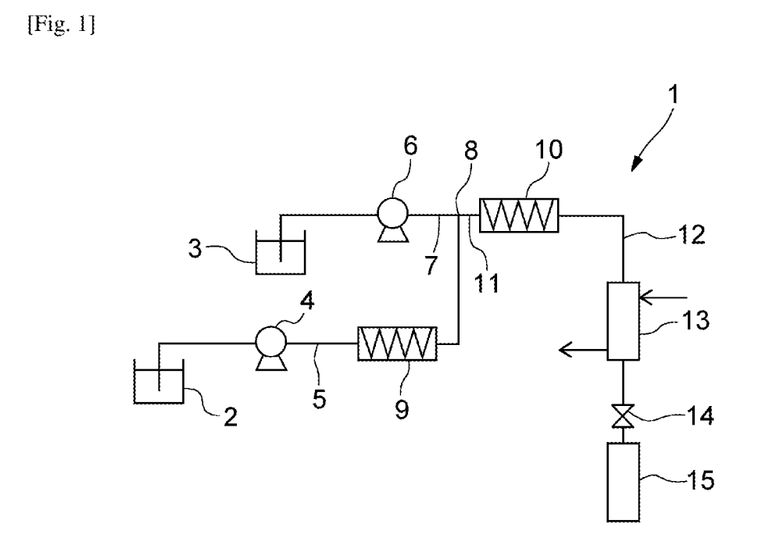
FIG. 1 is a schematic view of a hydrothermal synthesis apparatus to be favorably used to produce halogen-containing tin oxide particles of the present invention.

In the step (b), after the precursor is oxidized, the oxidized precursor is mixed with a liquid medium such as water to form a slurry, and this slurry is subjected to hydrothermal synthesis. FIG. 1 is a schematic view of an example of an apparatus to be favorably used in this hydrothermal synthesis. A hydrothermal synthesis apparatus 1 shown in FIG. 1 is a continuous synthesis apparatus. The apparatus 1 includes a water tank 2 in which water to be used in hydrothermal synthesis is stored. In addition, the apparatus 1 includes a raw material supplying tank 3 in which the above-mentioned slurry containing the precursor is stored. The water stored in the water tank 2 is sucked up by the driving of a pump 4 and supplied through a water supplying channel 5. The slurry stored in the raw material supplying tank 3 is sucked up by the driving of a pump 6 and supplied through a raw material supplying channel 7. The water supplying channel 5 and the raw material supplying channel 7 are connected to each other at a mixing portion 8. In the water supplying channel 5, a heating means 9 is arranged to be interposed between the pump 4 and the mixing portion 8.

A reactor 10 is arranged downstream of the mixing portion 8. The reactor 10 and the mixing portion 8 are connected via a reactant supplying channel 11. A product produced by the reaction that occurs in the reactor 10 is introduced into a cooler 13 through a product discharging channel 12. The cooler 13 includes a water cooling jacket (not shown). A pressure adjusting valve 14 and a water receiving tank 15 are arranged in this order on the downstream side of the cooler 13.

The step (c) in which the hydrothermal synthesis apparatus 1 having the above-described configuration is used will be described. The pump 4 is started to supply water, preferably pure water, stored in the water tank 2. The supplied water is pressurized by the pump 4 and introduced to the heating means 9. The water is heated by the heating means and brought into a high temperature and high pressure state. In parallel with this operation, the pump 6 is started to supply the slurry stored in the raw material supplying tank 3. The supplied slurry is pressurized by the pump 6. At this time, the slurry is not heated.

The water in a high temperature and high pressure state and the slurry in an ordinary temperature and high-pressure state are mixed in the mixing portion 8. A reaction solution obtained by mixing the water with the slurry is introduced to the reactor 10 through the reactant supplying channel 11. The reactor 10 is provided with a heating means (not shown), and thus the temperature of the reaction solution in the reactor 10 is maintained at the same temperature as that in the mixing portion 8. The reaction solution is then subjected to hydrothermal synthesis in a heated state in the mixing portion 8 and the subsequent reactor 10. That is, the temperature of the reaction solution in the mixing portion 8 is a temperature that is used to synthesize the desired halogen-containing tin oxide particles. During the hydrothermal synthesis, tin is oxidized by the action of the oxidant contained in the slurry.

The hydrothermal synthesis in the mixing portion 8 and the reactor 10 is performed at a temperature of preferably 270° C. or higher, more preferably 300° C. or higher, and even more preferably 350° C. or higher. Moreover, the hydrothermal synthesis is performed at a pressure of 20 MPa or higher, and more preferably 22.1 MPa or higher. The temperature of the hydrothermal synthesis can be controlled by the heating means 9 and the heating means (not shown) provided to the reactor 10. Meanwhile, the pressure can be controlled by adjusting the pressure in the pumps 4 and 6 and the degree to which the pressure adjusting valve 14 is open. In the apparatus 1, the channel between each of the pumps 4 and 6 and the pressure adjusting valve 14 forms a substantially closed space, and therefore, the pressure in the channel is constant.

The results of a study conducted by the inventors of the present invention revealed that it was advantageous to perform the hydrothermal synthesis in the mixing portion 8 and the reactor 10 under a supercritical condition or subcritical condition of water while satisfying the above-described temperature and pressure conditions. This makes it possible to successfully obtain halogen-containing tin oxide particles that are fine particles, have high conductivity, and have high crystallizability. As a result, halogen-containing tin oxide particles having high acid resistance can be successfully obtained.

The supercritical condition of water refers to a condition in which the temperature is 374° C. or higher and the pressure is 22.1 MPa or higher. On the other hand, in the present invention, the subcritical condition of water is defined as a condition in which the temperature is 270° C. or higher and the pressure is 20 MPa or higher and that does not satisfy the supercritical condition.

The halogen-containing tin oxide particles produced through the hydrothermal synthesis are rapidly cooled in the cooler 13 located downstream of the reactor 10, and thus the reaction is stopped. As a result, the particle diameters of the produced halogen-containing tin oxide particles are made uniform. The slurry containing the halogen-containing tin oxide particles, which has been cooled in the cooler 13, is collected in the water receiving tank 15 via the pressure adjusting valve 14.

The halogen-containing tin oxide particles obtained in this manner are favorably used as a material of a transparent electrode, or an antistatic material, for example, by utilizing their high conductivity. Also, the halogen-containing tin oxide particles are favorably used as catalyst carriers for a fuel cell by utilizing their high acid resistance. Furthermore, the halogen-containing tin oxide particles are also favorably used as an infrared shielding material.

A favorable example of use of the halogen-containing tin oxide particles of the present invention is use in a fuel cell electrode catalyst. This electrode catalyst is obtained by causing the halogen-containing tin oxide particles of the present invention to support a catalyst. A noble metal such as Pt, Ir, Ag, or Pd can be used as the catalyst. Furthermore, an alloy of this noble metal and a transition metal such as Mn, Fe, Co, or Ni can be used. In addition, an oxide, a carbonitride, or the like of a metal such as Ti or Zr can also be used, but there is no limitation thereto. These catalysts can be used alone or in combination of two or more. When only pure hydrogen is used as a fuel gas, it is sufficient that only a single element of the above-mentioned noble metals is used as the catalyst. When reformed gas is used as a fuel gas, the addition of Ru or the like is effective to prevent poisoning by CO. In this case, an alloy in which Pt, Ir, Ag, or Pd is used as a base substance and an additive metal such as Ru is contained can be used as the catalyst.

It is preferable that the catalytic metal has a smaller particle diameter because the surface area per unit mass of the metal for progressing an electrochemical reaction increases. However, if the particle diameter of the catalytic metal is too small, catalytic performance decreases. From these viewpoints, the primary particle diameter of the catalytic metal is preferably set to be within a range from 1 nm to 10 nm, and more preferably from 1 nm to 5 nm. Regarding the primary particle diameter of the catalytic metal, the electrode catalyst is magnified and observed under a transmission electron microscope (also referred to as "TEM" hereinafter) at a magnification from about 100,000 times to 500,000 times, software "Mac-VIEW", for example, is used to perform image analysis on TEM images of 50 or greater catalytic metal particles, and then the diameters of projected area equivalent circles are calculated. The arithmetic mean thereof is calculated, and the calculated value is taken as the primary particle diameter of the catalytic metal.

The amount of supported catalytic metal is preferably from 1 mass % to 60 mass %, and more preferably from 1 mass % to 30 mass %, with respect to the halogen-containing tin oxide supporting the catalytic metal. When the amount of supported catalytic metal is set to be within this range, sufficient catalytic activity is exhibited, and the catalytic metal can be supported in a highly dispersed state. The amount of supported catalytic metal particles can be measured using an ICP emission analysis method or the like, for example.

In order to cause the halogen-containing tin oxide to support the catalytic metal, it is sufficient that the halogen-containing tin oxide is added to a solution containing the source of the catalytic metal and then heated in a reducing atmosphere, for example. The catalytic metal in the source of the catalytic metal is reduced by this operation and supported on the surface of the halogen-containing tin oxide.

The electrode catalyst made of the halogen-containing tin oxide supporting the catalytic metal includes tin oxide ($SnO_2$) having a large crystallite diameter is in a fine particle form, has a large BET specific surface area and contains halogen at a specific ratio, as the same way in the halogen-containing tin oxide used as a substrate material. This suppresses the elution of halogen in this electrode catalyst during the operation of a fuel cell.

The crystallite diameter of the halogen-containing tin oxide does not significantly change after the halogen-containing tin oxide particles are caused to support the catalyst, as compared with that of the halogen-containing tin oxide before the halogen-containing tin oxide particles are caused to support the catalyst. That is, the crystallite diameter of the halogen-containing tin oxide in the electrode catalyst is substantially the same as the crystallite diameter thereof before the catalyst is supported. Therefore, as described above, the crystallite diameter of the halogen-containing tin oxide in the electrode catalyst is preferably from 8 nm to 30 nm, more preferably from 8 nm to 25 nm, and even more preferably from 8 nm to 20 nm.

When the crystallite diameter of the halogen-containing tin oxide in the electrode catalyst is as described above, the primary particle diameter of the halogen-containing tin oxide observed under a TEM is preferably from 5 nm to 100 nm, and more preferably from 8 nm to 50 nm. Regarding the primary particle diameter of the halogen-containing tin oxide, the electrode catalyst is magnified and observed under a TEM at a magnification from about 100,000 times to 500,000 times, software "Mac-VIEW", for example, is used to perform image analysis on TEM images of 50 or greater electrode catalyst particles, and then the diameters of projected area equivalent circles are calculated. The arithmetic mean thereof is calculated, and the calculated value is taken as the primary particle diameter of the halogen-containing tin oxide.

Since the amount of supported catalytic metal in the electrode catalyst is not excessive, the halogen-containing tin oxide particles and the electrode catalyst made of the halogen-containing tin oxide particles supporting the catalytic metal have substantially the same BET specific surface area. That is, the electrode catalyst has a BET specific surface area preferably from 25 m$^2$/g to 100 m$^2$/g, more preferably from 25 m$^2$/g to 90 m$^2$/g, and even more preferably from 40 m$^2$/g to 90 m$^2$/g. The same applies to the content ratio of the halogen, and the content ratio of the halogen in the halogen-containing tin oxide particles and the content ratio of the halogen in the electrode catalyst made of the halogen-containing tin oxide particles supporting the catalytic metal are substantially the same. That is, the content ratio of the halogen in the electrode catalyst is preferably from 0.01 mass % to 0.75 mass %, and more preferably from 0.2 mass % to 0.7 mass %. A method of measuring the crystallite diameter of the halogen-containing tin oxide, a method of measuring the BET specific surface area of the electrode catalyst, and a method of measuring the content ratio of the halogen in the electrode catalyst are as described above.

For example, the electrode catalyst made of the halogen-containing tin oxide supporting the catalytic metal is contained in at least one of an oxygen electrode and a fuel electrode in a membrane electrode assembly in which the oxygen electrode is arranged on one surface of a solid polymer electrolyte membrane and the fuel electrode is arranged on the other surface thereof.

In particular, it is preferable that the oxygen electrode and the fuel electrode include a catalyst layer containing the electrode catalyst, and a gas diffusion layer. It is preferable that the electrode catalyst is in contact with the solid polymer electrolyte membrane in order to cause the electrode reaction to smoothly progress. The gas diffusion layer functions as a supporting current collector having a current collecting function. Furthermore, the gas diffusion layer has a function of sufficiently supplying gas to the electrode catalyst. A gas diffusion layer similar to a gas diffusion layer that has been conventionally used in this type of technical field can be used. Carbon paper or carbon cloth, which is a porous material, can be used, for example. Specifically, the gas diffusion layer can be made of carbon cloth obtained by weaving yarns that contain a carbon fiber whose surface is coated with polytetrafluoroethylene and a carbon fiber whose surface is not coated therewith at a predetermined ratio, for example.

A solid polymer electrolyte similar to a solid polymer electrolyte that has been conventionally used in this type of technical field can be used. Examples thereof include a perfluorosulfonic acid polymer-based proton conductor membrane, a hydrocarbon-based polymer compound doped with an inorganic acid such as phosphoric acid, an organic/inorganic hybrid polymer in which a portion is substituted with a functional group serving as a proton conductor, and a proton conductor obtained by impregnating a polymer matrix with a phosphoric acid solution or a sulfuric acid solution.

Separators are arranged on the respective surfaces of the above-mentioned membrane electrode assembly to form a polymer electrolyte fuel cell. For example, a separator in which a plurality of protrusions (ribs) extending in one direction are formed at predetermined intervals on a surface facing the gas diffusion layer can be used as the separator. A portion between the adjacent protrusions forms a groove portion having a rectangular cross section. This groove portion is used as a supplying/discharging channel for fuel gas and oxidant gas such as air. The fuel gas and the oxidant gas are supplied from a fuel gas supplying means and an oxidant gas supplying means, respectively. It is preferable that the separators arranged on the respective surfaces of the membrane electrode assembly are placed such that the groove portions formed therein are orthogonal to each other. A minimum unit of a fuel cell has the above-described configuration, and a fuel cell can be configured by a cell stack obtained by arranging several tens to several hundreds of units of the configuration in parallel with one another.

Although the present invention has been described based on its preferred embodiment, the present invention is not limited to the above-described embodiment. For example, although a continuous-type reactor is used in the step (c) of the above-mentioned production method, a batch-type reactor may be used instead of the continuous-type reactor.

The fuel cell electrode catalyst obtained by causing the halogen-containing tin oxide particles of the present invention to support the catalyst can also be used as a carrier of a catalyst in various fuel cells other than the solid polymer electrolyte fuel cell, such as an alkaline fuel cell and a phosphoric acid fuel cell.

EXAMPLES

Hereinafter, the present invention will be described more specifically by way of examples. However, the scope of the present invention is not limited to these examples. Unless otherwise stated, "%" means "mass %".

Example 1

Step (a)

An alkali aqueous solution was prepared by dissolving 5.47 g of sodium hydroxide in 495 g of pure water. This solution was taken as a solution A. In addition, an aqueous solution of tin was obtained by dissolving 11.55 g of stannous fluoride in 489 g of pure water placed in a beaker. This solution was taken as a solution B. A tube pump was used to feed the entire amount of the solution A, which had been prepared in advance, into the solution B stirred using a paddle blade at room temperature (25° C.). After the addition of the solution A was finished, aging was performed under stirring for 5 minutes. Thereafter, decantation washing was performed using pure water until 100 μS/cm or lower was reached, and thus a slurry of a precursor was obtained.

Step (b)

Pure water was added to the slurry obtained in the step (a) to adjust the concentration to 1%, and then 200 g of the slurry was weighed out. Then, 1.07 g of 30% hydrogen peroxide solution was added thereto. Thereafter, aging was performed under stirring for 5 minutes.

Step (c)

The apparatus shown in FIG. 1 was used to perform hydrothermal synthesis. The temperature in the reactor 10 was set to 450° C. The pressure in the reactor 10 was set to 25 MPa. The temperature-pressure condition is the supercritical condition of water. Moreover, the length of the pipe between the mixing portion 8 and the outlet of the reactor 10 and the pump flow rate were adjusted such that the reaction time was 5 minutes. In this manner, fluorine-containing tin oxide particles were obtained.

Example 2

In the step (a) in Example 1, 0.56 g of $Na_2WO_4 \cdot 2H_2O$ was further added to the solution A. The temperature in the reactor 10 was set to 600° C. Fluorine-containing tin oxide particles were obtained in the same manner as in Example 1, except that the above operations were performed.

Example 3

In the step (c) in Example 1, the temperature in the reactor 10 was set to 400° C. Fluorine-containing tin oxide particles were obtained in the same manner as in Example 2, except that the above operation was performed.

Example 4

In the step (a) in Example 3, 0.40 g of $Na_2MoO_4 \cdot 2H_2O$ was further added to the solution A instead of $Na_2WO_4 \cdot 2H_2O$. Fluorine-containing tin oxide particles were obtained in the same manner as in Example 3, except that the above operation was performed.

Example 5

In the step (c) in Example 2, the temperature in the reactor 10 was set to 300° C. Fluorine-containing tin oxide particles were obtained in the same manner as in Example 2, except that the above operation was performed.

Example 6

In the step (a) in Example 5, tin was neutralized by feeding the solution A into the solution B in a state in which the solution B was cooled to 10° C. Fluorine-containing tin oxide particles were obtained in the same manner as in Example 5, except that the above operation was performed.

Comparative Example 1

A batch-type autoclave vessel (45 cc) was prepared, and 30 cc of the slurry obtained in the step (b) in Example 1 was added to this vessel. Next, this vessel was allowed to stand in a drier, and hydrothermal synthesis was carried out. The temperature in the drier was set to 230° C., and the drier was cooled 24 hours after the set temperature was reached. In this manner, fluorine-containing tin oxide particles were obtained.

Evaluation

Regarding the fluorine-containing tin oxide particles obtained in the examples and the comparative example, the BET specific surface area and the crystallite diameter of fluorine-containing tin oxide were measured using the above-described methods. Then, the value $D_C/D_B$, which is the ratio between a crystallite diameter $D_C$ and a diameter $D_B$ converted from the BET specific surface area, was calculated from the measured BET specific surface area and crystallite diameter. Furthermore, the content ratio of fluorine was measured using the above-described method. In addition, the acid resistance test was performed using the above-described method to measure the elution ratio of fluorine, and the volume resistivities were measured prior to and after the acid resistance test. Table 1 below shows the results.

TABLE 1

| | | Ex. 1 | Ex. 2 | Ex. 3 | Ex. 4 | Ex. 5 | Ex. 6 | Comp. Ex. 1 |
|---|---|---|---|---|---|---|---|---|
| Halogen | | F | F | F | F | F | F | F |
| Additive element | | — | W | W | Mo | W | W | W |
| Neutralization temperature (° C.) | | 25 | 25 | 25 | 25 | 25 | 10 | 25 |
| Temperature in reactor 10 (° C.) | | 450 | 600 | 400 | 400 | 300 | 300 | 230 |
| Pressure in reactor 10 (MPa) | | 25 | 25 | 25 | 25 | 25 | 25 | 2.8 |
| BET specific surface area (m²/g) | | 35 | 41 | 52 | 55 | 74 | 86 | 76 |
| Crystallite diameter $D_C$ (nm) | | 21.3 | 17.5 | 15.7 | 13.5 | 11.7 | 9.0 | 11.3 |
| $D_C/D_B$ | | 0.86 | 0.84 | 0.91 | 0.86 | 1.00 | 0.90 | 1.00 |
| Content ratio of halogen (mass %) | | 0.25 | 0.39 | 0.37 | 0.44 | 0.51 | 0.30 | 0.78 |
| Elution ratio of halogen (%) | | <1 | <1 | <1 | <1 | <1 | <1 | 4.5 |
| Volume resistivity | Before acid resistance test R1 (Ω·cm) | 290 | 6.2 | 16 | 19 | 120 | 30 | 1.7 |
| | After acid resistance test R2 (Ω·cm) | 320 | 8.1 | 23 | 32 | 200 | 45 | 3500 |
| | R2/R1 | 1.10 | 1.31 | 1.44 | 1.68 | 1.67 | 1.50 | 2059 |

As is clear from the results shown in Table 1, it was found that, regarding the fluorine-containing tin oxide particles of the examples, the elution ratio of fluorine with respect to an acid was low, and the results before and after the acid resistance tests show that increase of volume resistivity was suppressed. In contrast, it was found that, in Comparative Example 1 in which a mild hydrothermal synthesis condition was employed, the elution ratio of fluorine with respect to an acid was high, and the results before and after the acid resistance tests show that there was a significant increase in the volume resistivity.

Example 7

Step (a)

An alkali aqueous solution containing tungsten was prepared by dissolving 6.59 g of sodium hydroxide in 594 g of pure water and further dissolving 0.66 g of $Na_2WO_4 \cdot 2H_2O$. This solution was taken as a solution A. In addition, an aqueous solution containing tin and fluorine was obtained by dissolving 15.59 g of stannous chloride and 6.76 g of sodium fluoride in 580 g of pure water placed in a beaker. This solution was taken as a solution B. A tube pump was used to feed the entire amount of the solution A, which had been prepared in advance, into the solution B stirred using a paddle blade at room temperature (25° C.). After the addition of the solution A was finished, aging was performed under stirring for 5 minutes. Thereafter, decantation washing was performed using pure water until 100 μS/cm or lower was reached, and thus a slurry of a precursor was obtained.

Step (b)

Pure water was added to the slurry obtained in the step (a) to adjust the concentration to 1%, and then 200 g of slurry was weighed out. Then, 1.07 g of 30% hydrogen peroxide solution was added thereto. Thereafter, aging was performed under stirring for 5 minutes.

Step (c)

The apparatus shown in FIG. 1 was used to perform hydrothermal synthesis. The temperature in the reactor 10 was set to 600° C. The pressure in the reactor 10 was set to 25 MPa. The temperature-pressure condition is the supercritical condition of water. Moreover, the length of the pipe between the mixing portion 8 and the outlet of the reactor 10 and the pump flow rate were adjusted such that the reaction time was 5 minutes. In this manner, fluorine-containing tin oxide particles were obtained. The same measurements as those in Example 1 were performed on the obtained particles. Table 2 shows the results.

Examples 8 to 10

In Example 7, the feed amount of sodium fluoride was reduced to 3.38 g (Example 8), 0.334 g (Example 9), or 0.035 g (Example 10). Fluorine-containing tin oxide particles were obtained in the same manner as in Example 7, except that the feed amount of sodium fluoride was reduced. The same measurements as those in Example 1 were performed on the obtained particles. Table 2 shows the results.

TABLE 2

| | | Ex. 7 | Ex. 8 | Ex. 9 | Ex. 10 |
|---|---|---|---|---|---|
| Halogen | | F | F | F | F |
| Additive element | | — | W | W | W |
| Neutralization temperature (° C.) | | 25 | 25 | 25 | 25 |
| Temperature in reactor 10 (° C.) | | 600 | 600 | 600 | 600 |
| Pressure in reactor 10 (MPa) | | 25 | 25 | 25 | 25 |
| Feed amount of NaF (g) | | 6.76 | 3.38 | 0.338 | 0.035 |
| BET specific surface area (m$^2$/g) | | 36 | 37 | 44 | 49 |
| Crystallite diameter $D_C$ (nm) | | 20.3 | 19.5 | 18.2 | 16.4 |
| $D_C/D_B$ | | 0.85 | 0.83 | 0.92 | 0.92 |
| Content ratio of halogen (mass %) | | 0.23 | 0.21 | 0.10 | 0.02 |
| Elution ratio of halogen (%) | | <1 | <1 | <1 | <1 |
| Volume resistivity | Before acid resistance test R1 (Ω · cm) | 5.7 | 7.2 | 11 | 130 |
| | After acid resistance test R2 (Ω · cm) | 8.4 | 9.0 | 20 | 165 |
| | R2/R1 | 1.47 | 1.25 | 1.82 | 1.27 |

Example 11

In the step (a) in Example 2, a solution C obtained by dissolving 0.54 g of SbCl$_3$ in 1.00 g of 35% HCl was dissolved in the solution A instead of dissolving Na$_2$WO$_4$.2H$_2$O of the solution A, and the resulting solution was added to the solution B. The amount of sodium hydroxide was set to 6.05 g. Fluorine-containing tin oxide particles were obtained in the same manner as in Example 2, except that the above operations were performed. The same measurements as those in the example were performed on the obtained particles. Table 3 shows the results.

Example 12

In the step (a) in Example 2, 0.62 g of Na$_3$PO$_4$.12H$_2$O was added to the solution A instead of dissoving Na$_2$WO$_4$.2H$_2$O of the solution A. The amount of sodium hydroxide was set to 5.30 g. Fluorine-containing tin oxide particles were obtained in the same manner as in Example 2, except that the above operations were performed. The same measurements as those in Example 1 were performed on the obtained particles. Table 3 shows the results.

TABLE 3

| | | Ex. 11 | Ex. 12 |
|---|---|---|---|
| Halogen | | F | F |
| Additive element | | Sb | P |
| Neutralization temperature (° C.) | | 25 | 25 |
| Temperature in reactor 10 (° C.) | | 600 | 600 |
| Pressure in reactor 10 (MPa) | | 25 | 25 |
| BET specific surface area (m$^2$/g) | | 40 | 38 |
| Crystallite diameter $D_C$ (nm) | | 18.9 | 19.7 |
| $D_C/D_B$ | | 0.88 | 0.86 |
| Content ratio of halogen (mass %) | | 0.41 | 0.44 |
| Elution ratio of halogen (%) | | <1 | <1 |
| Volume resistivity | Before acid resistance test R1 (Ω · cm) | 159 | 59 |
| | After acid resistance test R2 (Ω · cm) | 784 | 302 |
| | R2/R1 | 4.93 | 5.12 |

Example 13

Step (a)

An alkali aqueous solution was prepared by dissolving 5.47 g of sodium hydroxide in 495 g of pure water and further dissolving 0.56 g of Na$_2$WO$_4$.2H$_2$O. This solution was taken as a solution A. In addition, an aqueous solution of tin was obtained by dissolving 11.55 g of stannous fluoride in 489 g of pure water placed in a beaker. This solution was taken as a solution B. A tube pump was used to feed the entire amount of the solution A, which had been prepared in advance, into the solution B stirred using a paddle blade at room temperature (25° C.). After the addition of the solution A was finished, aging was performed under stirring for 5 minutes. Thereafter, decantation washing was performed using pure water until 100 μS/cm or lower was reached, and thus a slurry of a precursor was obtained.

Step (b)

The slurry obtained in the step (a) was filtered out, and the solid content was dried to form powder of a precursor. This powder was fired in an air atmosphere at 450° C. for 5 hours. The precursor was oxidized by this operation.

Step (c)

After 3.0 g of the powder obtained in the step (b), 27.0 g of pure water, and 135 g of 0.5-mmφ zirconia beads were placed in a 50-mL resin vessel and subjected to wet grinding using a paint shaker or 2 hours, pure water was added thereto to obtain a slurry whose concentration was adjusted to 1%. This slurry was subjected to hydrothermal synthesis using the apparatus shown in FIG. 1. The temperature in the reactor 10 was set to 600° C. The pressure in the reactor 10 was set to 25 MPa. The temperature-pressure condition is the supercritical condition of water. Moreover, the length of the pipe between the mixing portion 8 and the outlet of the reactor 10 and the pump flow rate were adjusted such that the reaction time was 5 minutes. In this manner, fluorine-containing tin oxide particles were obtained. The same measurements as those in Example 1 were performed on the obtained particles. Table 4 shows the results.

Examples 14 and 15

In Example 13, the set temperature in the reactor 10 was lowered to 450° C. (Example 14) or 300° C. (Example 15)

in the step (c). Fluorine-containing tin oxide particles were obtained in the same manner as in Example 13, except that the temperature in the reactor 10 was set to a lower temperature. The same measurements as those in Example 1 were performed on the obtained particles. Table 4 shows the results.

TABLE 4

|  | Ex. 13 | Ex. 14 | Ex. 15 |
|---|---|---|---|
| Halogen | F | F | F |
| Additive element | W | W | W |
| Neutralization temperature (° C.) | 25 | 25 | 25 |
| Firing temperature (° C.) | 450 | 450 | 450 |
| Temperature in reactor 10 (° C.) | 600 | 450 | 300 |
| Pressure in reactor 10 (MPa) | 25 | 25 | 25 |
| BET specific surface area (m$^2$/g) | 32 | 36 | 51 |
| Crystallite diameter $D_C$ (nm) | 17.2 | 14.0 | 12.0 |
| $D_C/D_B$ | 0.64 | 0.59 | 0.71 |
| Content ratio of halogen (mass %) | 0.19 | 0.21 | 0.28 |
| Elution ratio of halogen (%) | <1 | <1 | <1 |
| Volume resistivity Before acid resistance test R1 (Ω · cm) | 4.4 | 6.1 | 23 |
| After acid resistance test R2 (Ω · cm) | 55 | 91 | 342 |
| R2/R1 | 12.5 | 14.9 | 14.9 |

Example 16

In this example, the halogen-containing tin oxide particles obtained in Example 2 were used to produce an electrode catalyst for a cathode of a solid polymer electrolyte fuel cell. The following describes specific procedures.

After 5 ml of $H_2PtCl_6$ solution (equivalent to 1 g of Pt) was dissolved in 295 ml of distilled water, 15.3 g of $NaHSO_3$ was added thereto, and then the resulting solution was diluted with 1400 ml of distilled water. While the pH was adjusted to about 5 by adding a 5% aqueous solution of NaOH, 35% hydrogen peroxide solution (120 ml) was dripped, and thus a solution containing platinum colloids was obtained. At this time, a 5% aqueous solution of NaOH was added as appropriate to maintain the pH of the solution at about 5. An aliquot in an amount equivalent to 0.435 g of Pt was taken from the obtained solution, and 5 g of the halogen-containing tin oxide particles was added thereto. The resulting mixture was mixed at 90° C. for 3 hours. Thereafter, the solution was cooled and then subjected to solid-liquid separation. In order to remove chloride ions from hydrated powder obtained by the solid-liquid separation, the hydrated powder was diluted with 1500 ml of distilled water again and boiled at 90° C. for 1 hour, and then the solution was cooled and subjected to solid-liquid separation. This washing operation was performed four times. Lastly, after the solid-liquid separation, the powder was dried in an air at 60° C. for 12 hours. This caused the halogen-containing tin oxide particles to support platinum including non-stoichiometric platinum oxides on their surfaces. Next, platinum was reduced by performing heat treatment on these halogen-containing tin oxide particles in a 4 vol % $H_2/N_2$ atmosphere at 80° C. for 2 hours. The amount of supported platinum measured using an ICP emission analysis method was 8% with respect to the halogen-containing tin oxide particles supporting platinum. The same measurements as those in Example 1 were performed on the obtained electrode catalyst. Table 5 shows the results.

Example 17

In this example, the feed amount of platinum in Example 16 was increased, and thus the amount of supported platinum was increased. The amount of supported platinum was 14% with respect to the halogen-containing tin oxide particles supporting platinum. An electrode catalyst was obtained in the same manner as in Example 16, except that the feed amount of platinum was increased. The same measurements as those in Example 1 were performed on the obtained electrode catalyst. Table 5 shows the results.

Example 18

In this example, the halogen-containing tin oxide particles obtained in Example 5 were used instead of those obtained in Example 2. An electrode catalyst was obtained in the same manner as in Example 16, except that the above halogen-containing tin oxide particles were used. The same measurements as those in Example 1 were performed on the obtained electrode catalyst. Table 5 shows the results.

TABLE 5

|  | Ex. 16 | Ex. 17 | Ex. 18 |
|---|---|---|---|
| Halogen-containing tin oxide particles | Ex. 2 | Ex. 2 | Ex. 5 |
| Halogen | F | F | F |
| Additive element | W | W | W |
| Supported Pt amount (mass %) | 8 | 14 | 8 |
| BET specific surface area (m$^2$/g) | 42 | 41 | 63 |
| Crystallite diameter $D_C$ (nm) | 17.5 | 17.5 | 11.7 |
| $D_C/D_B$ | 0.85 | 0.83 | 0.85 |
| $SnO_2$ primary particle diameter (nm) | 18 | 18 | 11 |
| Pt primary particle diameter (nm) | 2.6 | 3.0 | 2.3 |
| Content ratio of halogen (mass %) | 0.39 | 0.39 | 0.51 |
| Elution ratio of halogen (%) | <1 | <1 | <1 |
| Volume resistivity Before acid resistance test R1 (Ω · cm) | 12 | 4.8 | 39 |
| After acid resistance test R2 (Ω · cm) | 16 | 9.3 | 246 |
| R2/R1 | 1.33 | 1.94 | 6.31 |

The invention claimed is:

1. A method for producing halogen-containing tin oxide particles, comprising:
   neutralizing a halogen-containing aqueous solution containing a divalent tin compound with an alkali to form a slurry containing a tin oxide precursor;
   oxidizing the precursor; and
   performing hydrothermal treatment on the slurry containing the oxidized precursor under a high-temperature-high-pressure condition in which a temperature is 270° C. or higher and pressure is 20 MPa or higher.

2. The method for producing halogen-containing tin oxide particles according to claim 1, wherein the slurry containing the precursor is mixed with an oxidant to oxidize the precursor.

3. The method for producing halogen-containing tin oxide particles according to claim 2, wherein the hydrothermal treatment is performed on the slurry containing the oxidized precursor under a subcritical condition or supercritical condition of water.

4. The method for producing halogen-containing tin oxide particles according to claim 1, wherein the precursor is fired to be oxidized.

5. The method for producing halogen-containing tin oxide particles according to claim 1, wherein the hydrothermal treatment is performed on the slurry containing the oxidized precursor under a subcritical condition or supercritical condition of water.

6. The method for producing halogen-containing tin oxide particles according to claim 1, wherein the aqueous solution containing the tin compound is neutralized with the alkali at 30° C. or lower to produce the precursor.

7. A fuel cell electrode catalyst comprising halogen-containing tin oxide particles supporting catalytic metal particles,
   wherein the halogen-containing tin oxide particles have a BET specific surface area from 25 $m^2/g$ to 100 $m^2/g$ and a crystallite diameter from 8 nm to 30 nm, and the fuel cell electrode catalyst comprises halogen in an amount from 0.01 mass % to 0.75 mass %.

8. A membrane electrode assembly comprising a pair of electrodes including an oxygen electrode and a fuel electrode, the electrodes being arranged on respective surfaces of a solid polymer electrolyte membrane,
   wherein the fuel cell electrode catalyst according to claim 7 is contained in at least one of the oxygen electrode and the fuel electrode.

9. A solid polymer electrolyte fuel cell comprising the membrane electrode assembly according to claim 8, and separators arranged on the respective surfaces of the membrane electrode assembly.

* * * * *